United States Patent
Kim (10) Patent No.: US 11,631,980 B2
(45) Date of Patent: Apr. 18, 2023

(54) METHOD AND BATTERY MANAGEMENT SYSTEM FOR CONTROLLING CELL BALANCING

(71) Applicant: SAMSUNG SDI CO., LTD., Yongin-si (KR)

(72) Inventor: Jinwoo Kim, Yongin-si (KR)

(*) Notice: Subject to any disclaimer, the term of this patent is extended or adjusted under 35 U.S.C. 154(b) by 66 days.

(21) Appl. No.: 16/794,744

(22) Filed: Feb. 19, 2020

(65) Prior Publication Data

US 2020/0266636 A1 Aug. 20, 2020

(30) Foreign Application Priority Data

Feb. 20, 2019 (KR) .................. 10-2019-0020036

(51) Int. Cl.
*H02J 7/00* (2006.01)

(52) U.S. Cl.
CPC .................. *H02J 7/0014* (2013.01)

(58) Field of Classification Search
CPC .. H02J 50/12; H02J 7/025; H02J 50/80; H02J 50/90; H02J 50/70; H02J 50/60; H02J 7/0016; H02J 7/0014; H02J 7/0047; H02J 7/342; H02J 7/00; H02J 7/0013; H02J 7/0027; H02J 7/0042; H02J 7/0045; H02J 7/0048; H02J 7/005; H02J 2207/40; H02J 7/00036; H02J 7/00047; H02J 7/0024; H02J 7/008; H02J 7/0026; H02J 7/0021; H02J 3/32; H02J 7/345; H02J 2300/10;
(Continued)

(56) References Cited

U.S. PATENT DOCUMENTS 8,896,315 B1 * 11/2014 Davies .................. H02J 7/0019
324/434
2010/0134068 A1 6/2010 Lim
(Continued)

FOREIGN PATENT DOCUMENTS

CN 202888895 U 4/2013
CN 206041557 U 3/2017
(Continued)

OTHER PUBLICATIONS

European Search Report dated Jun. 29, 2020.
(Continued)

*Primary Examiner* — Binh C Tat
(74) *Attorney, Agent, or Firm* — Lee IP Law, P.C.

(57) ABSTRACT

A battery management system for a plurality of battery modules, the battery management system including, for each battery module among the plurality of battery modules, a respective integrated circuit configured to perform a cell balancing control function of the battery module; and a battery controller in communication with the integrated circuits, the battery controller configured to control the integrated circuits according to a cycle that includes a first mode for sequentially activating cell balancing of the battery modules during a first period and a second mode for stopping the cell balancing of the battery modules during a second period that follows the first period, the battery controller repeating the cycle after the second period, repeating the cycle including changing an order in which the cell balancing of the battery modules is activated in the first mode.

14 Claims, 6 Drawing Sheets

(58) Field of Classification Search
CPC ............... H02J 2300/24; H02J 2300/28; H02J 2300/40; H02J 2310/48; H02J 3/28; H02J 3/381; H02J 3/383; H02J 3/386; H02J 3/388; H02J 7/0019; H02J 7/0022; H02J 7/00304; H02J 7/0063; H02J 7/00712; H02J 7/007194; H02J 7/1415; H02J 7/1423; H02J 7/1492; H02J 3/38; H02J 7/0029; H02J 7/0049; H02J 7/0068; H02J 7/00718; H02J 7/007192; H02J 7/0091; H02J 7/34; H02J 7/35; H02J 7/36; H02J 7/00309; H02J 7/00308; H02J 7/007182; H02J 7/0031; H02J 7/0018; H02J 7/00714; H02J 2207/20; H02J 7/02; H02J 2310/40; H02J 2310/44; H02J 7/00032; H02J 7/00041; H02J 7/007; H02J 7/007184; H02J 9/061; H02J 1/08; H02J 1/082; H02J 2310/23; H02J 7/00306; H02J 7/0069; H02J 7/0071; H02J 7/00711; H02J 1/06; H02J 1/102; H02J 1/108; H02J 1/14; H02J 2300/30; H02J 2310/18; H02J 5/00; H02J 7/00034; H02J 7/00302; H02J 7/0036; H02J 7/0044; H03H 7/40; H01M 2010/4271; H01M 10/482; B60L 58/22; Y02E 60/10; H04L 2209/805; G01R 31/3648; G01R 31/382
USPC .................................................. 320/126–135
See application file for complete search history.

(56) References Cited

U.S. PATENT DOCUMENTS

| | | |
|---|---|---|
| 2011/0121645 A1 | 5/2011 | Zhang et al. |
| 2011/0316483 A1* | 12/2011 | Zhang ................. H01M 10/482 |
| | | 320/118 |
| 2012/0043945 A1 | 2/2012 | Kim et al. |
| 2014/0035532 A1 | 2/2014 | Brandl et al. |
| 2015/0303728 A1 | 10/2015 | Miura et al. |
| 2016/0261127 A1* | 9/2016 | Worry ................. H01M 10/425 |
| 2019/0052098 A1 | 2/2019 | Hong et al. |

FOREIGN PATENT DOCUMENTS

| | | |
|---|---|---|
| CN | 108275017 A | 7/2018 |
| EP | 2490315 A1 | 8/2012 |
| JP | 2004-201361 A | 7/2004 |
| JP | 2015-12711 A | 1/2015 |
| KR | 10-2018-0044485 A | 5/2018 |
| KR | 10-2018-0103214 A | 9/2018 |

OTHER PUBLICATIONS

Chinese Office Action dated Jan. 29, 2023 (including a Search Report dated Jan. 28, 2023), of the corrresponding Chinese Patent Application No. 202010098931.5.

* cited by examiner

METHOD AND BATTERY MANAGEMENT SYSTEM FOR CONTROLLING CELL BALANCING

CROSS-REFERENCE TO RELATED APPLICATION

Korean Patent Application No. 10-2019-0020036, filed on Feb. 20, 2019, in the Korean Intellectual Property Office, and entitled: "Method and Battery Management System for Controlling Cell Balancing," is incorporated by reference herein in its entirety.

BACKGROUND

1. Field

Example embodiments relate to a cell balancing control method and a battery management system performing the same.

2. Description of the Related Art

Recently, according to strengthening of environmental regulations including $CO_2$ regulations, interest in environmentally-friendly vehicles has been increasing. Accordingly, vehicle companies have been actively researching and developing pure electrical vehicles and hydrogen vehicles, as well as hybrid and plug-in hybrid vehicles.

The above information disclosed in this Background section is only for enhancement of understanding of the background of the art and therefore it may contain information that does not form the prior art that is already known in this country to a person of ordinary skill in the art.

SUMMARY

Embodiments are directed to a battery management system for a plurality of battery modules, the battery management system including, for each battery module among the plurality of battery modules, a respective integrated circuit configured to perform a cell balancing control function of the battery module; and a battery controller in communication with the integrated circuits, the battery controller configured to control the integrated circuits according to a cycle that includes a first mode for sequentially activating cell balancing of the battery modules during a first period and a second mode for stopping the cell balancing of the battery modules during a second period that follows the first period, the battery controller repeating the cycle after the second period, repeating the cycle including changing an order in which the cell balancing of the battery modules is activated in the first mode.

The battery controller, when entering the first mode, may output corresponding balancing start signals to the battery modules to activate the cell balancing of the battery modules.

The battery controller may change a cell balancing activation order of the battery modules by changing an order in which the balancing start signals are output to the battery modules for each cycle.

The battery controller may change an order in which the cell balancing of the battery modules is activated for each cycle such that an average balancing execution time during the first period is equalized for the battery modules.

The battery controller may cyclically shift the order in which the cell balancing of the battery modules is activated for each cycle.

Embodiments are also directed to a cell balancing control method of a battery management system, the method including determining whether or not cell balancing of a plurality of battery modules is performed based on a cell voltage detection result for the battery modules; and repeating a cycle of operating in a first mode and a second mode in a predetermined period when cell balancing is performed. Operating in the first mode may include sequentially activating cell balancing of the battery modules during a first period, operating in the second mode may include deactivating the cell balancing of the battery modules during a second period when the first period ends, and repeating the cycle may include changing an order in which the cell balancing of the battery modules is activated in the first mode.

Operating in the first mode may include activating the cell balancing of the battery modules by outputting corresponding balancing start signals to the battery modules.

Changing the order of activation of the cell balancing may include changing an order in which the balancing start signals are output.

Changing the order of activation of the cell balancing may include equalizing cell balancing during the first period for each of the battery modules.

Changing the order of activation of the cell balancing may include cyclically shifting an order in which the cell balancing of the battery modules is activated in the first mode.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. In addition, it will also be understood that when a layer is referred to as being "between" two layers, it can be the only layer between the two layers, or one or more intervening layers may also be present. Like reference numerals refer to like elements throughout. In addition, electrically connecting two constituent elements includes not only directly connecting the constituent elements but also connecting the constituent elements via another constituent element therebetween. The constituent element therebetween may include a switch, a resistor, a capacitor, and the like. In describing example embodiments, an expression of connection indicates electrical connection unless explicitly described to be direct connection.

Hereinafter, a cell balancing control method and a battery management system performing the same will be described in detail with reference to necessary drawings.

Figure 1:
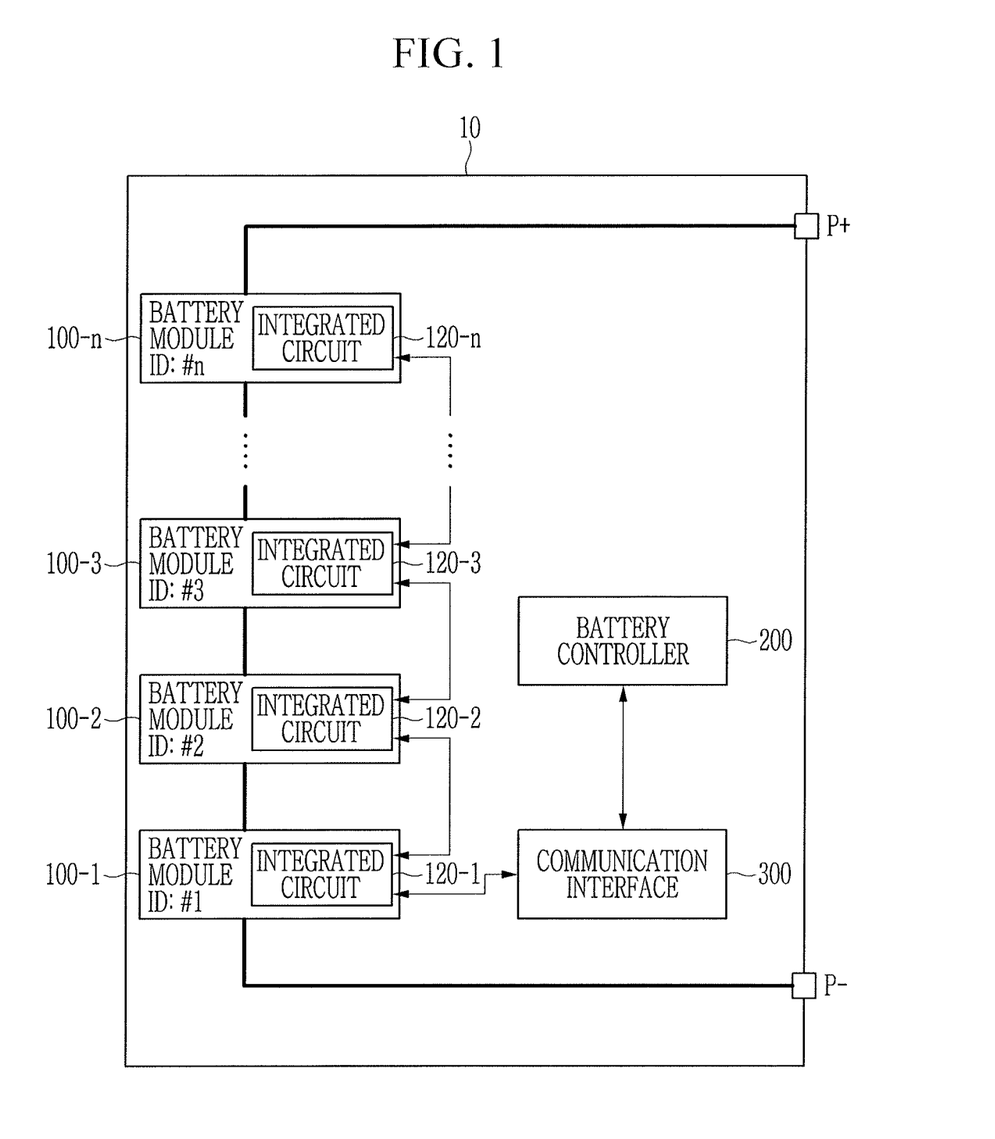
FIG. 1 schematically illustrates a battery pack according to an example embodiment.
Figure 2:
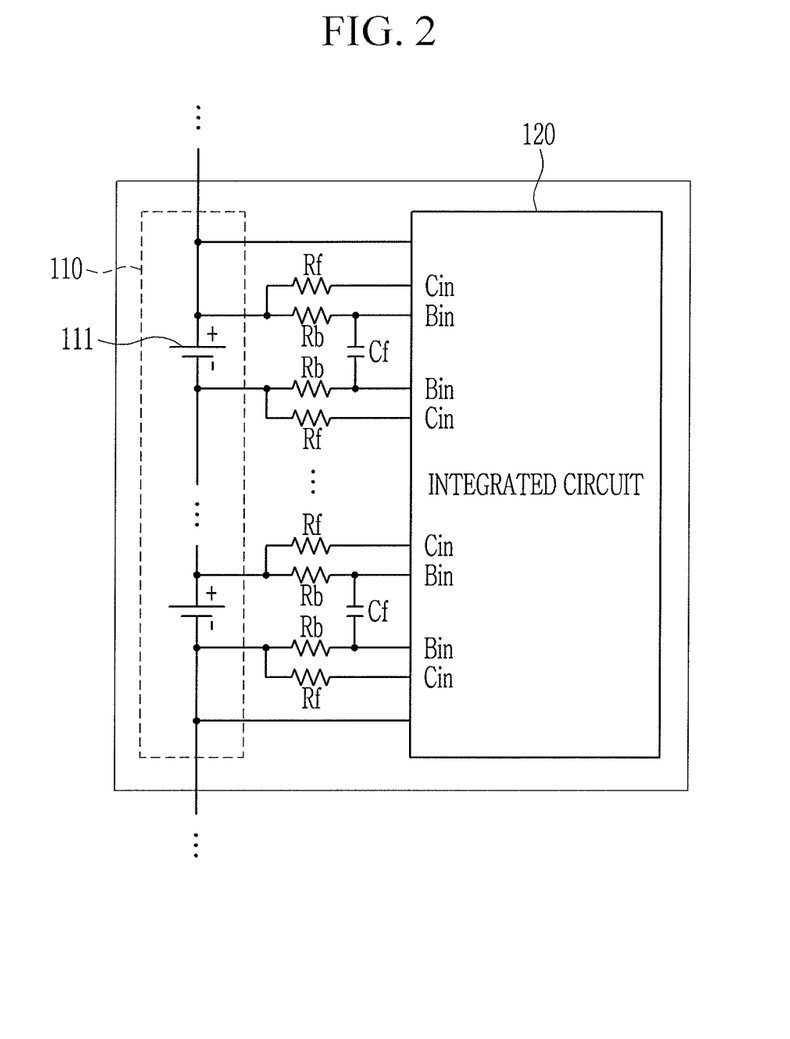
FIG. 2 schematically illustrates a battery module according to an example embodiment.

FIG. 1 schematically illustrates a battery pack according to an example embodiment, and FIG. 2 schematically illustrates a battery module according to an example embodiment.

Referring to FIG. 1, a battery pack 10 according to an example embodiment may include a plurality of battery pack terminals P+ and P−, a plurality of battery modules 100-1, 100-2, 100-3, . . . , and 100-n, a battery controller 200, and a communication interface 300.

The battery modules 100-1, 100-2, 100-3, . . . , and 100-n may be connected in series between the battery pack terminals P+ and P−. Each of the battery modules 100 may include a cell stack 110 and an integrated circuit 120 as illustrated in FIG. 2 (respectively denoted as integrated circuits 120-1, 120-2, 120-3, . . . , and 120-n in FIG. 1).

Referring to FIG. 2, the cell stack 110 may include a plurality of cells 111 electrically connected in series and/or in parallel with each other. The cell stacks 110 included in the battery modules 100-1, 100-2, 100-3, . . . , 100-n may be electrically connected in series between the pack terminals P+ and P− to output high voltage electrical energy.

The integrated circuit 120 may detect state information of the battery modules 100. For example, the integrated circuit may detect one or more of a cell voltage, a charge/discharge current, a temperature, and the like of each of the cells 111 within the battery module 100. For example, the integrated circuit 120 may detect a cell voltage of each cell 111 included in a corresponding battery module 100 through a voltage detection circuit (not illustrated) included in the integrated circuit 120.

The voltage detection circuit of the integrated circuit 120 may be connected to opposite ends of the corresponding cell 111 through two input terminals Cin and two filter resistors Rf of the integrated circuit 120 to detect the cell voltage of the corresponding cell 111. Also, two balancing resistors Rb may be connected to opposite ends of the corresponding cell 111 through balancing terminals Bin. Filter capacitors Cf may be connected across the balancing terminals Bin corresponding to each cell 111.

The state information of the battery module 100 detected by the integrated circuit 120, such as a cell voltage detection result, may be cyclically transferred to the battery controller 200 to be used for controlling charge/discharge of the battery module 100, cell balancing, and the like. The integrated circuit 120 may also control the cell balancing of the corresponding battery module 100.

Figure 3:
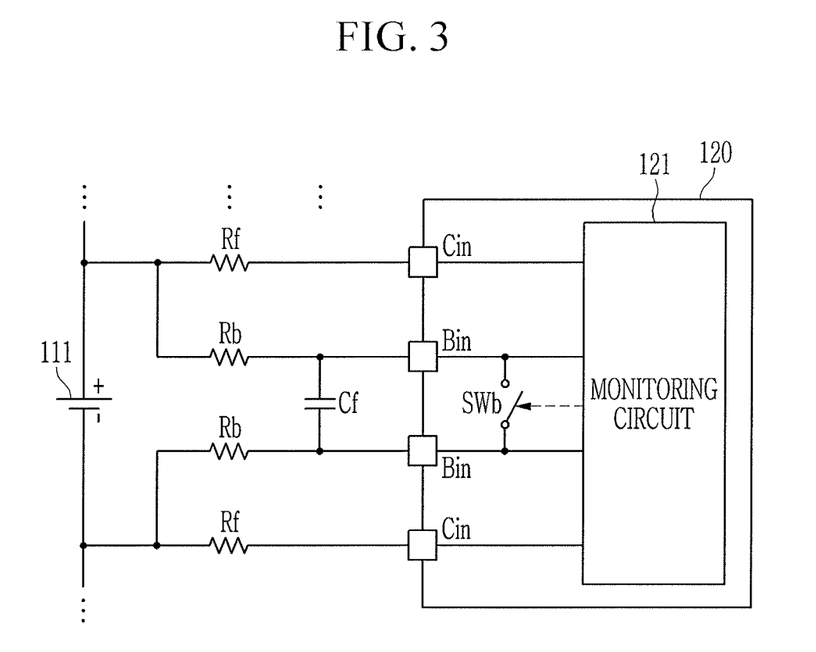
FIG. 3 illustrates an example of a cell balancing circuit of a battery module according to an example embodiment.

FIG. 3 illustrates an example of a cell balancing circuit of a battery module according to an example embodiment.

Referring to FIG. 3, an example of a cell balancing circuit may include two balancing resistors Rb, each respectively connected between an end of the cell 111 and a balancing terminal Bin to form a discharge path. The cell balancing circuit may further include a balancing switch SWb connected between the two balancing resistors Rb through the balancing terminals Bin, and connected between opposite ends of the corresponding cell 111 through the two balancing resistors Rb.

The balancing switch SWb may be used to conduct or block a cell balancing current flowing through the balancing resistors Rb. When the balancing switch SWb is turned on (or closed) by a monitoring circuit 121, a balancing current flows through the balancing resistors Rb connected to both ends of the corresponding cell 111 so as to perform discharge of the corresponding cell 111. On the other hand, when the balancing switch SWb is turned off (or opened) by the monitoring circuit 121, a discharge path is cut off, so that a balancing current flow of the corresponding cell 111 is blocked.

The integrated circuit 120 may be implemented to include an analog front end (AFE) IC of a battery, a cell voltage monitoring (CVM) IC, and the like, and may operate as a battery management system of the battery pack 10 together with the battery controller 200, which is described below in further detail.

Referring to FIG. 1 again, the battery controller 200 may transmit/receive data with respect to the integrated circuits 120-1, 120-2, 120-3, . . . , and 120-n of the plurality of battery modules 100-1, 100-2, 100-3, . . . , and 100-n through the communication interface 300. The communication interface 300 may support signal transmission and reception between the battery controller 200 and the integrated circuits 120-1, 120-2, 120-3, . . . , and 120-n using different communication methods.

For example, when a signal is received from the battery controller 200 through a serial peripheral interface (SPI) such as a controller area network (CAN) communication, the communication interface 300 may transfer it to the integrated circuits 120-1, 120-2, 120-3, . . . , and 120-n in a daisy chain manner through a universal asynchronous receiver transmitter (UART). In addition, for example, when a signal from the integrated circuits 120-1, 120-2, 120-3, . . . , and 120-n is transferred through the UART in the daisy chain manner, it may be transferred to the battery controller 200 through the SPI. In another implementation, the battery controller 200 and the integrated circuits 120-1, 120-2, 120-3, . . . , and 120-n may directly communicate with each other, and the communication interface 300 may be omitted.

In operation, the battery controller 200 may receive state information (e.g., a cell voltage detection result) of each of the battery modules 100-1, 100-2, 100-3, . . . , and 100-n from the integrated circuits 120-1, 120-2, 120-3, . . . , and 120-n, and may control charging and discharging of each of the battery modules 100-1, 100-2, 100-3, . . . , and 100-n based on the received state information.

In addition, the battery controller 200 may determine whether cell balancing is performed for each of the battery modules 100-1, 100-2, 100-3, . . . , and 100-n based on cell voltage detection results of each of the battery modules 100-1, 100-2, 100-3, . . . , and 100-n received from the integrated circuits 120-1, 120-2, 120-3, . . . , and 120-n.

The battery controller 200 may control cell balancing by transmitting a control signal to a battery module determined to need cell balancing among the battery modules 100-1, 100-2, 100-3, . . . , and 100-n. Hereinafter, for convenience of description, a control signal instructing the battery controller 200 to start cell balancing for a specific battery module is referred to as a "balancing start signal", and a control signal instructing the battery controller 200 to stop, i.e., to deactivate the cell balancing of the battery modules to enter the balancing idle mode, is referred to as a "balancing stop signal".

With reference to FIG. 3, in the case where cell balancing is performed by allowing a current to flow through the balancing resistor Rb, when a cell balancing duration is too long, excessive heat generation of the balancing resistor Rb may occur. In addition to the cell balancing control, the battery controller 200 may periodically perform functions such as diagnosis and reception of state information of the battery modules 100-1, 100-2, 100-3, . . . , and 100-$n$. Accordingly, the battery controller 200 may alternately operate in a balancing mode for allowing cell balancing to the battery modules 100-1, 100-2, 100-3, . . . , and 100-$n$ and a balancing idle mode for stopping cell balancing of the battery modules 100-1, 100-2, 100-3, . . . , and 100-$n$ depending on a predetermined balancing cycle.

Figure 4:
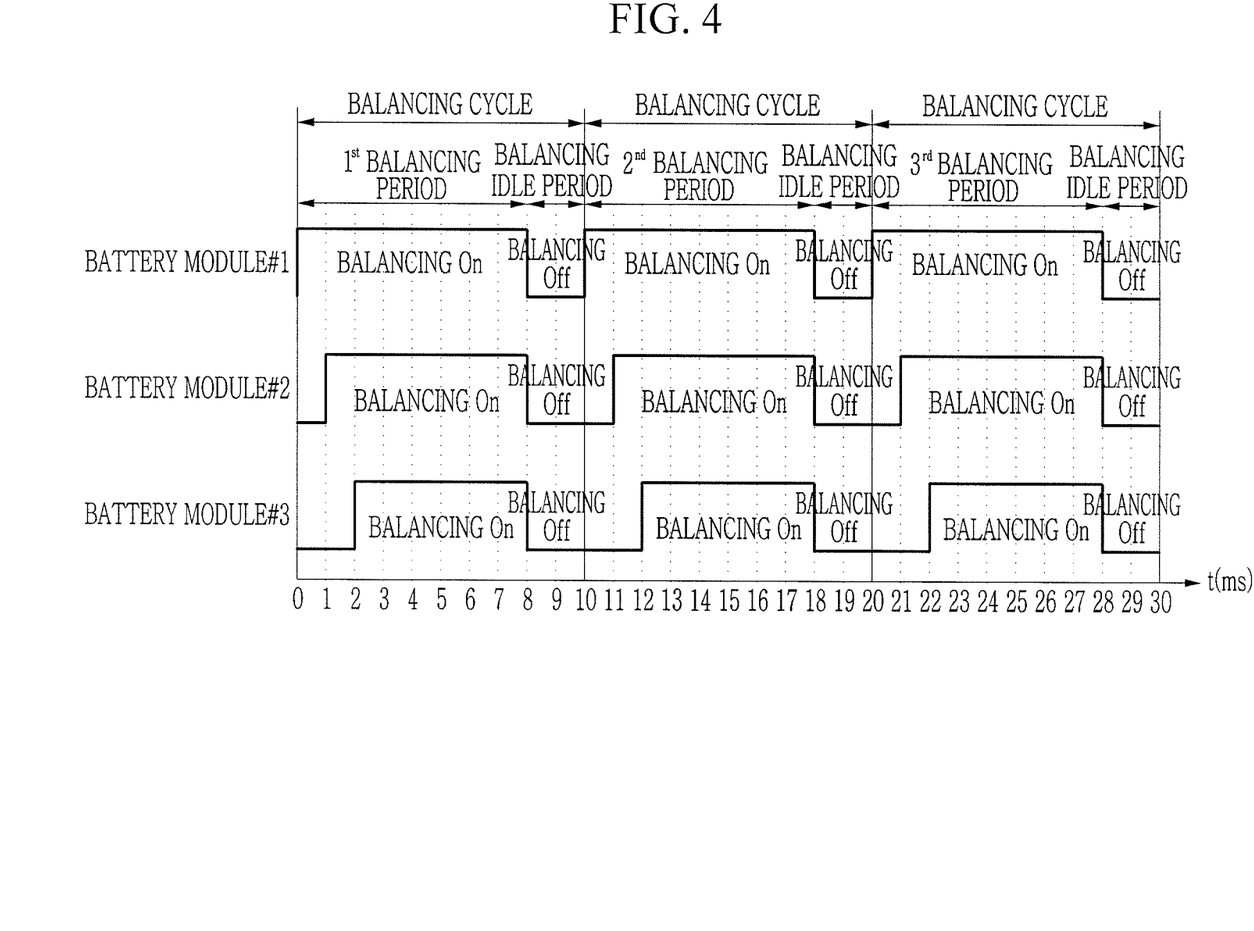
FIG. 4 illustrates a reference example in which a battery controller outputs a control signal to control cell balancing of battery modules.

FIG. 4 illustrates a reference example in which a battery controller outputs a control signal to control cell balancing of battery modules.

Referring to FIG. 4, the battery controller 200 may operate in the balancing mode during a balancing period and operate in the balancing idle mode during a balancing idle period. During the balancing idle period, the battery controller 200 stops balancing of the battery modules 100-1, 100-2, 100-3, . . . , and 100-$n$, and may perform functions such as diagnosis and state information reception. The battery controller 200 may control the cell balancing procedure to be discretely executed over a plurality of balancing periods in the case of a battery module that requires a time for cell balancing that is longer than a length of the balancing period.

In the case of a plurality of battery modules that need cell balancing, the battery controller 200 may sequentially output balancing start signals transferred to these battery modules, rather than simultaneously, e.g., because of the characteristics of the signal transferring method between the battery controller and the AFE IC. Referring to FIG. 4 as an example, when entering the balancing period, the battery controller 200 may sequentially output corresponding balancing start signals in an order of the battery module #1→ the battery module #2→ the battery module #3, and thus, the cell balancing of the battery modules may be sequentially activated.

The balancing start signal may include identification information of (or ID) corresponding battery module together with cell information related to a cell to be balanced, such that each of the integrated circuits 120-1, 120-2, 120-3, . . . , and 120-$n$ may determine whether it is the intended integrated circuit 120 that is to be activated by the balancing start signal that is currently being transmitted.

The balancing stop signal that is output to the battery modules 100-1, 100-2, 100-3, . . . , and 100-$n$ to enter the balancing idle mode may be implemented as a control signal that is applied to all the battery modules in a same way (such that the "balancing off" time is the same for all of the battery modules), and thus it may be output only once to stop the balancing of all the battery modules 100-1, 100-2, 100-3, . . . , and 100-$n$.

In the reference example of FIG. 4, the battery controller 200 sequentially outputs the balancing start signals in an order that is determined depending on a position of the corresponding battery module. Additionally, even though the battery modules may perform cell balancing for a same balancing period, a time that the balancing is actually performed may vary depending on the battery module. Referring to FIG. 4 as an example, the battery module #1, the battery module #2, and the battery module #3, all performed cell balancing in first, second, and third balancing periods, but an actual time that cell balancing is activated differs from the battery module #1→ the battery module #2→ the battery module #3 due to the deviation of activation time in each balancing period. In an example embodiment, in order to eliminate such a deviation, a balancing activation order of the battery modules 100-1, 100-2, 100-3, . . . , and 100-$n$ may be adjusted by changing an order in which the balancing start signal is output every balancing cycle so as to equalize an actual balancing execution time.

Figure 5:
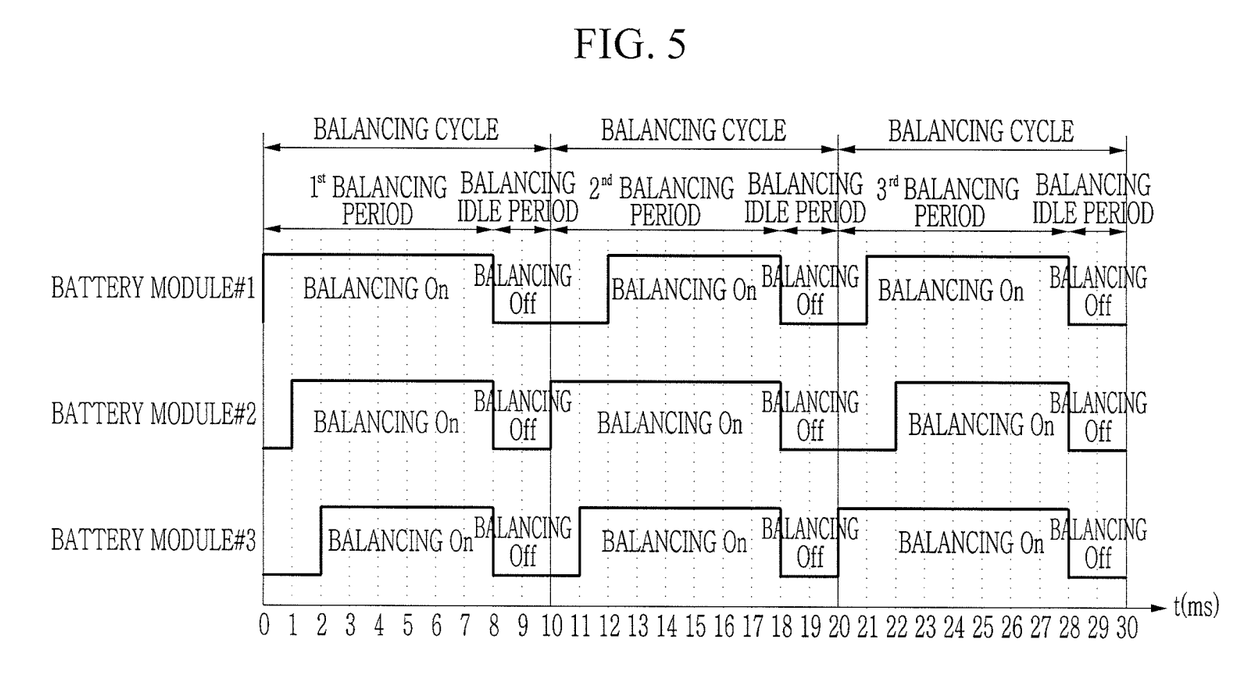
FIG. 5 illustrates an example of equalizing a balancing execution time in a battery management system according to an example embodiment.

FIG. 5 illustrates an example of equalizing a balancing execution time in a battery management system according to an example embodiment.

Referring to FIG. 5 as an example, during a first balancing period, the battery controller 200 sequentially outputs balancing start signals in an order of the battery module #1→ the battery module #2→ the battery module #3, that is, in the same manner as shown in FIG. 4. And, in the same manner as shown in FIG. 4, the balancing off time may be the same for all of the battery modules #1, #2, and #3.

Different from FIG. 4, in the example shown in FIG. 5 the battery controller 200 sequentially outputs balancing start signals in an order of the battery module #2→ the battery module #3→ the battery module #1 during a second balancing period.

Also different from FIG. 4, in the example shown in FIG. 5 the battery controller 200 sequentially outputs balancing start signals in an order of the battery module #3→ the battery module #1→ the battery module #2 and during a third balancing period.

Thus, in the example embodiment shown in FIG. 5, the battery controller 200 may controls the balancing activation order of the battery modules to be changed every balancing cycle by cyclically shifting the output order of the balancing start signal of each battery module for each balancing cycle. By controlling the balancing activation order, the battery controller 200 may equalize the time for performing the actual balancing in the battery module #1, the battery module #2, and the battery module #3 during three balancing periods by changing the order in which the balancing start signal is output to the battery modules every balancing period. Thus, the average balancing execution time for each balancing period may be equalized for all the battery modules.

Figure 6:
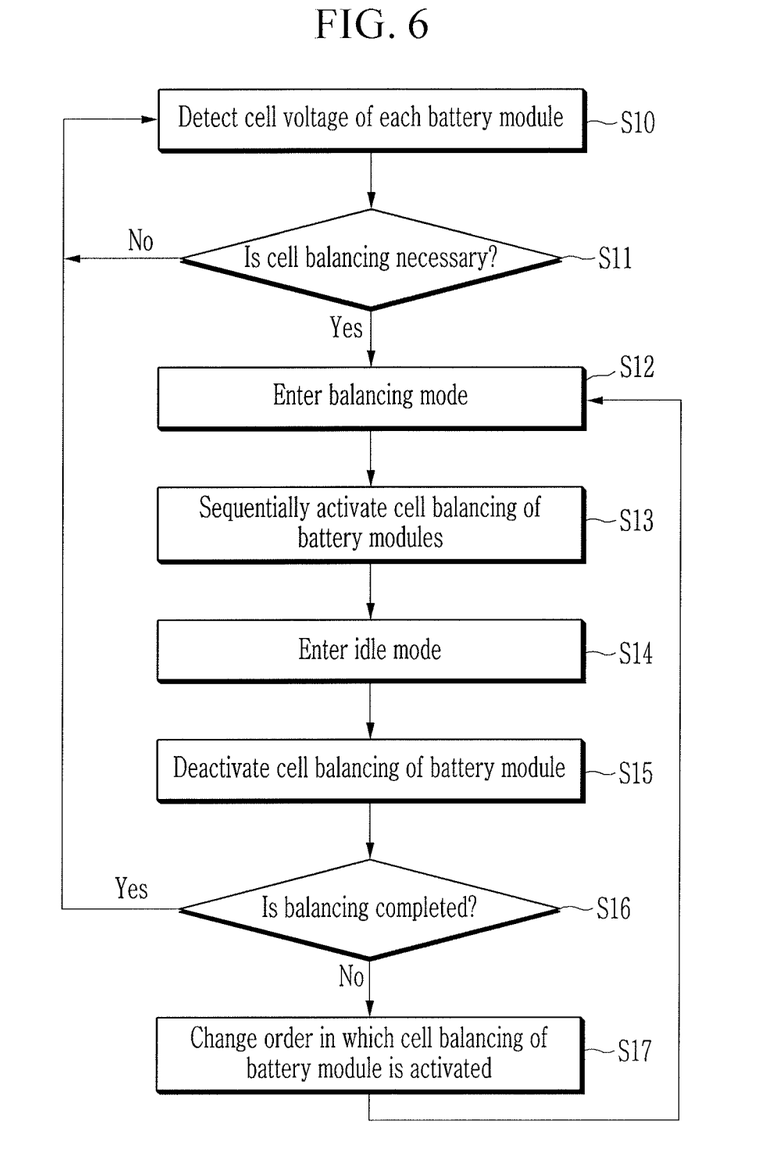
FIG. 6 schematically illustrates a cell balancing control method of a battery management system according to an example embodiment.

FIG. 6 schematically illustrates a cell balancing control method of a battery management system according to an example embodiment. The cell balancing control method of FIG. 6 may be performed by the battery management system of the battery pack 10 described with reference to FIG. 1.

Referring to the example embodiment illustrated in FIG. 6, in operation S10, the battery management system cyclically detects cell voltages of the cells 111 constituting each of the battery modules 100-1, 100-2, 100-3, . . . , and 100-$n$ through each of the integrated circuits 120-1, 120-2, 120-3, . . . , and 120-$n$. The cell voltage detection result detected by each of the integrated circuit 120-1, 120-2, 120-3, . . . , and 120-$n$ may be transmitted to the battery controller 200.

In operation S11, the battery controller 200 determines whether cell balancing for each of the battery modules 100-1, 100-2, 100-3, . . . , and 100-$n$ is necessary.

If the battery controller 200 determines that balancing is not necessary, operation S10 may be repeated.

If the battery controller 200 determines that cell balancing is necessary, the battery controller 200 enters the balancing mode (operation S12).

In operation S13, the battery controller 200 sequentially outputs balancing start signals to the battery modules 100-1, 100-2, 100-3, . . . , and 100-$n$ to sequentially activate cell balancing of the battery modules 100-1, 100-2, 100-3, . . . , and 100-$n$.

After a predetermined time (balancing period) has elapsed after entering the balancing mode, in operation S14 the battery controller 200 enters the balancing idle mode.

In operation S15, the battery controller 200 outputs balancing stop signals to the battery modules 100-1, 100-2, 100-3, . . . , and 100-*n* to deactivate cell balancing of the battery modules 100-1, 100-2, 100-3, . . . , and 100-*n*.

In operation S16, the battery management system evaluates whether balancing is completed.

If the battery controller 200 determines that balancing is completed, operation S10 may be repeated.

If the battery controller 200 determines that balancing is not completed, then operation S17 is performed.

In this process, in operation 17, the battery management system acts to equalize the balancing execution time between the battery modules 100-1, 100-2, 100-3, . . . , and 100-*n* by changing the balancing activation order of the battery modules 100-1, 100-2, 100-3, . . . , and 100-*n*. The change in balancing order may be performed whenever the steps S12 to S15 are repeated, that is, every balancing cycle.

Subsequent to operation S17, operations S12 to S15 are repeated for another balancing cycle until the cell voltages of the battery modules 100-1, 100-2, 100-3, . . . , and 100-*n* are equalized to complete the cell balancing.

Thus, the average cell balancing execution time for the balancing periods may be equalized among the battery modules 100-1, 100-2, 100-3, . . . , and 100-*n*.

By way of summation and review, a battery pack for storing electrical energy obtained from various energy sources may be mounted in an environmentally-friendly vehicle. A battery pack mounted on an environment-friendly vehicle or the like may include a plurality of battery modules connected in series with each other to supply high voltage electrical energy, and each of the battery modules may include a plurality of cells connected in series and/or in parallel with each other. In addition, a battery management system (BMS) may be mounted in the battery pack to protect the battery pack by detecting voltages, temperatures, and charge/discharge currents of each cell or battery module, e.g., when the battery pack is in an abnormal state. Additionally, a cell balancing function that compensates a voltage deviation between cells by monitoring the voltage of each of the cells constituting the battery module may be controlled as a function of the battery management system.

The battery management system may include an analog front end (AFE) integrated circuit (IC) that performs cell voltage monitoring and cell balancing functions for cell balancing, for each battery module, and a battery controller serving as an upper-level controller that communicates with each AFE IC to control the cell balancing of each battery module.

In general, it may be a challenge for the battery controller to simultaneously activate the cell balancing for battery modules that require cell balancing due to characteristics of a signal transferring method between the battery controller and the AFE IC, and thus cell balancing activation may be performed sequentially for each battery module. Accordingly, battery modules may have different timings at which cell balancing is activated. Further, although cell balancing may be implemented for a same period for each of the battery modules, the actual cell balancing time may vary for each battery module.

As described above, embodiments may provide a cell balancing control method that reduces or eliminates a deviation of cell balancing execution times caused by a difference in cell balancing activation times between the battery modules, and a battery management system performing the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

10: battery pack
100, 100-1, 100-2, 100-3, . . . , 100-*n*: battery modules
110: cell stack
111: cell
120, 120-1, 120-2, 120-3, . . . , 120-*n*: integrated circuits
121: monitoring circuit
200: battery controller
300: communication interface
SWb: balancing switch
Rb: balancing resistance
Rf: filter resistance
Bin: balancing terminal
Cin: input terminal

What is claimed is:

1. A battery management system for a plurality of battery modules, the battery management system comprising:

for each battery module among the plurality of battery modules, a respective integrated circuit configured to perform a cell balancing control function of the battery module; and a battery controller in communication with the integrated circuits, the battery controller configured to control the integrated circuits according to a cycle that includes a first mode for sequentially activating cell balancing of the battery modules during a first period and a second mode for stopping the cell balancing of the battery modules during a second period that follows the first period, the battery controller repeating the cycle after the second period, repeating the cycle including changing an order in which the cell balancing of the battery modules is activated in the first mode, wherein:

the battery controller is configured to output a balancing stop signal to all of the integrated circuits such that the second period begins at a same time for all of the plurality of battery modules.

2. The battery management system as claimed in claim 1, wherein the battery controller, when entering the first mode, outputs corresponding balancing start signals to the battery modules to activate the cell balancing of the battery modules.

3. The battery management system as claimed in claim 2, wherein the battery controller changes a cell balancing activation order of the battery modules by changing an order in which the balancing start signals are output to the battery modules for each cycle.

4. The battery management system as claimed in claim 1, wherein the battery controller changes an order in which the cell balancing of the battery modules is activated for each cycle such that an average balancing execution time during the first period is equalized for the battery modules.

5. The battery management system as claimed in claim 1, wherein the battery controller cyclically shifts the order in which the cell balancing of the battery modules is activated for each cycle.

6. A cell balancing control method of a battery management system, the method comprising:
   determining whether or not cell balancing of a plurality of battery modules is performed based on a cell voltage detection result for the battery modules; and
   repeating a cycle of operating in a first mode and a second mode in a predetermined period when cell balancing is performed, wherein:
   operating in the first mode includes sequentially activating cell balancing of the battery modules during a first period,
   operating in the second mode includes deactivating the cell balancing of the battery modules during a second period when the first period ends,
   repeating the cycle includes changing an order in which the cell balancing of the battery modules is activated in the first mode, and
   the second period begins at a same time for all of the battery modules.

7. The cell balancing control method as claimed in claim 6, wherein operating in the first mode includes activating the cell balancing of the battery modules by outputting corresponding balancing start signals to the battery modules.

8. The cell balancing control method as claimed in claim 7, wherein changing the order of activation of the cell balancing includes changing an order in which the balancing start signals are output.

9. The cell balancing control method as claimed in claim 6, wherein changing the order of activation of the cell balancing includes equalizing cell balancing during the first period for each of the battery modules.

10. The cell balancing control method as claimed in claim 6, wherein changing the order of activation of the cell balancing includes cyclically shifting an order in which the cell balancing of the battery modules is activated in the first mode.

11. A battery management system for a plurality of battery modules, the battery management system comprising:
   for each battery module among the plurality of battery modules, a respective integrated circuit configured to perform a cell balancing control function of the battery module; and
   a battery controller in communication with the integrated circuits, the battery controller configured to activate cell balancing of the plurality of battery modules during respective balancing-on periods and stop the cell balancing of the plurality of battery modules during respective balancing-off periods that immediately follow the balancing-on periods, wherein:
   for each battery module in need of cell balancing among the plurality of battery modules, the battery controller activates the cell balancing in each of n balancing cycles, where n is equal to the total number of battery modules in need of cell balancing among the plurality of battery modules, and
   in each of the n balancing cycles, a battery module for which cell balancing is first activated is different from all other balancing cycles of the n balancing cycles.

12. The battery management system as claimed in claim 11, wherein each balancing cycle includes a balancing-on period and a balancing-off period for each battery module in need of cell balancing among the plurality of battery modules.

13. The battery management system as claimed in claim 11, wherein:
   when the plurality of battery modules includes a first battery module, a second battery module, and a third battery module in need of cell balancing, the n balancing cycles include, in sequence, a first balancing cycle, then a second balancing cycle, and then a third balancing cycle,
   in the first balancing cycle, the balancing-on period of the first battery module is activated prior to activating the balancing on-period of the second battery module and prior to activating the balancing-on period of the third battery module,
   in the second balancing cycle, the balancing-on period of the second battery module is activated prior to activating the balancing on-period of the second battery module and prior to activating the balancing-on period of the first battery module, and
   in the third balancing cycle, the balancing-on period of the third battery module is activated prior to activating the balancing on-period of the first battery module and prior to activating the balancing-on period of the second battery module.

14. The battery management system as claimed in claim 11, wherein the battery controller is configured to output a balancing stop signal to all of the integrated circuits such that the balancing-off period begins at a same time for all of the plurality of battery modules.

* * * * *